Oct. 18, 1960 E. W. DRAKENGREN 2,956,696
APPARATUS FOR AUTOMATICALLY PILING BRICKS
Filed Oct. 5, 1955 4 Sheets-Sheet 1

INVENTOR.
*Erik Wilhelm Drakengren.*
BY
*Maxwell E. Sparrow.*
ATTORNEY

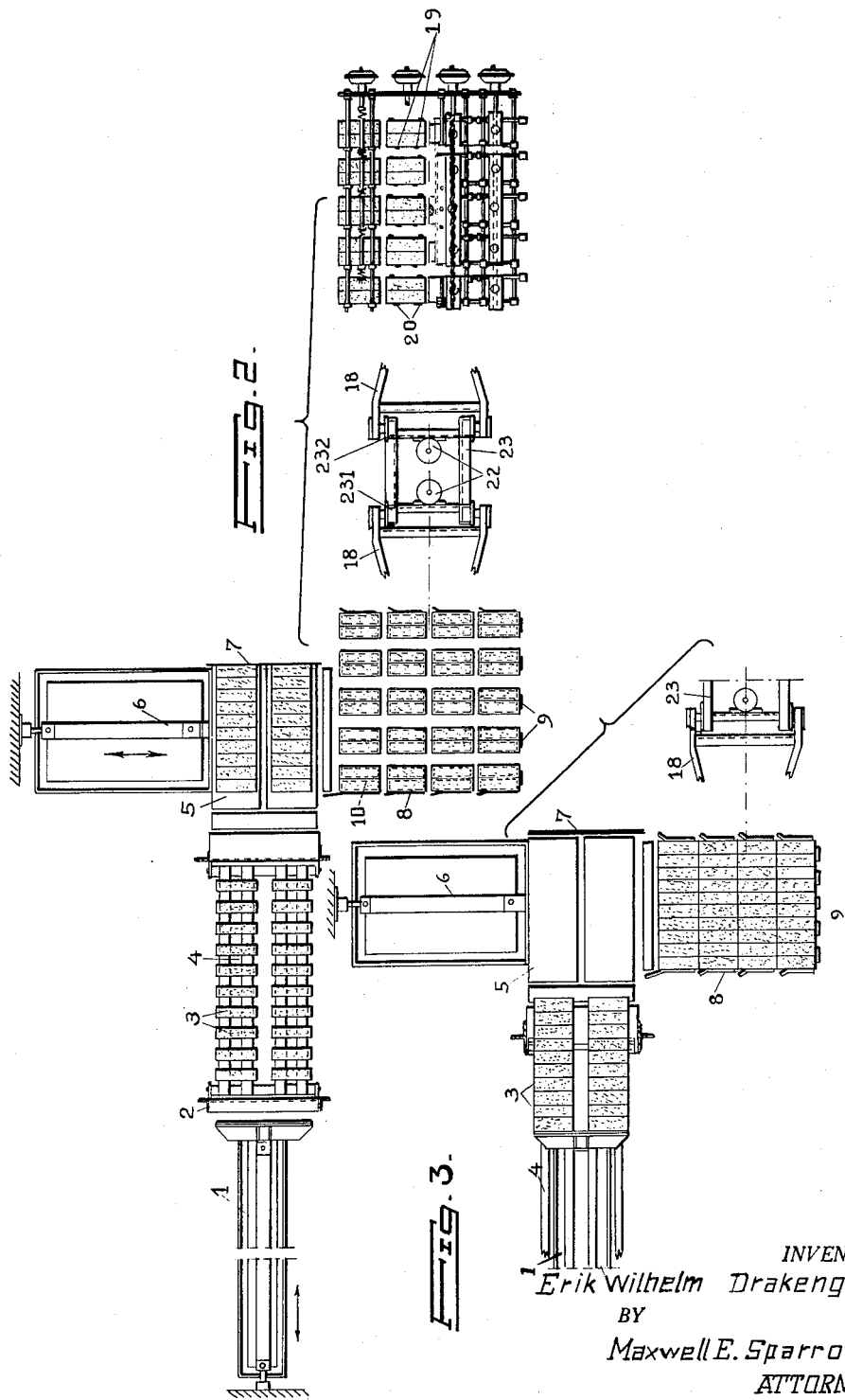

Oct. 18, 1960  E. W. DRAKENGREN  2,956,696
APPARATUS FOR AUTOMATICALLY PILING BRICKS
Filed Oct. 5, 1955  4 Sheets-Sheet 3
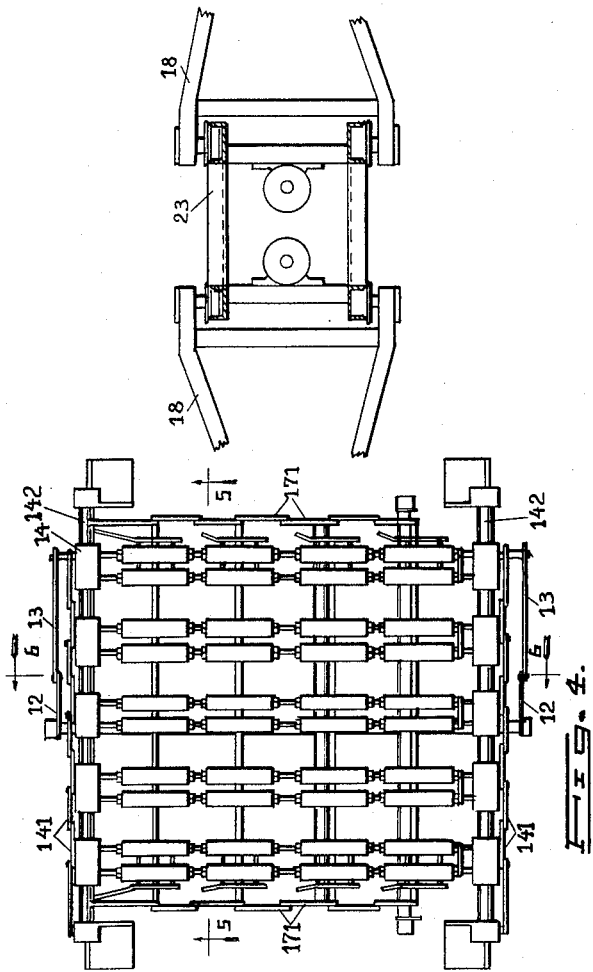
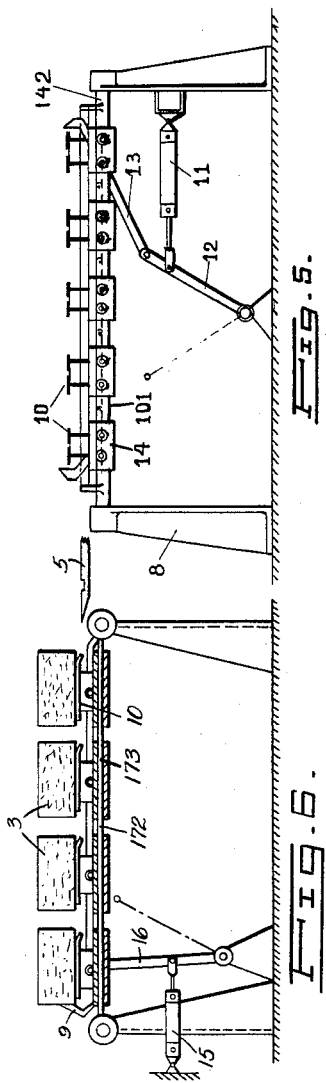
INVENTOR.
Erik Wilhelm Drakengren.
BY
Maxwell E. Sparrow
ATTORNEY.

Oct. 18, 1960     E. W. DRAKENGREN     2,956,696
APPARATUS FOR AUTOMATICALLY PILING BRICKS
Filed Oct. 5, 1955     4 Sheets-Sheet 4
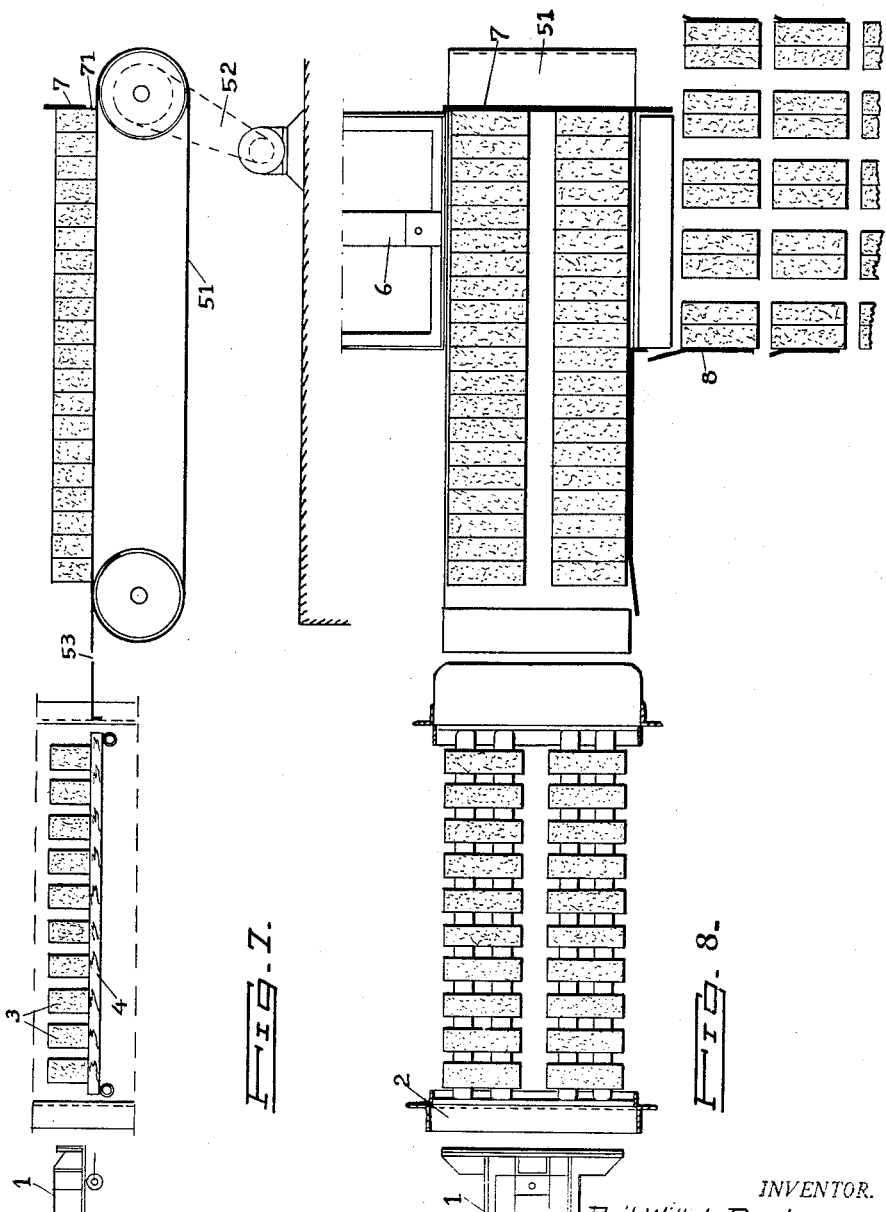
INVENTOR.
*Erik Wilhelm Drakengren*
BY
*Maxwell E. Sparrow.*
ATTORNEY.

United States Patent Office 2,956,696
Patented Oct. 18, 1960

2,956,696

APPARATUS FOR AUTOMATICALLY PILING BRICKS

Erik Wilhelm Drakengren, Arstavagen 103, Johanneshov, Stockholm, Sweden

Filed Oct. 5, 1955, Ser. No. 538,653

Claims priority, application Sweden Oct. 7, 1954

5 Claims. (Cl. 214—6)

This invention relates to devices for automatically piling bricks.

The transport of bricks from the drying-house and the piling of the same in suitable piles for baking are considered to be one of the most tiresome manipulation in brick works. For that reason it is desirous and urgent to transfer the said manually performed operations to mechanical and automatic apparatus which render it possible to increase the capacity and to lower the running costs due to a reduced number of hands.

There are mechanical piling devices which, however, are adapted to perform only part of the operational stages, while the main part of the work has to be done manually.

The present invention has for its object to bring forth devices by means of which the said working operations are performed mechanically and automatically, and in an efficient and practical manner.

An apparatus according to the invention for automatically piling bricks is substantially characterized by the combination of a device for preliminary piling the bricks in an elevator, a feeding device for pushing the bricks together and transferring them to a platform, a second feeding device for transferring the bricks from the platform to a dividing device, a gripper device for transferring the bricks to a conveyor device for the transport of bricks to a brick-kiln, the said devices being arranged to be driven in synchronism in dependence upon each other.

Further characteristics will be given in the following description with reference to the annexed drawings which schematically by way of example show some embodiments of the invention.

In the drawings:

Fig. 2 is a plan view in section, wherein certain parts shown in Fig. 1 are excluded.

Fig. 3 shows a part of the apparatus in a position different from that shown in Fig. 2, in plan view and partially in section.

Fig. 4 shows in a plan view of a device for separating pairs of bricks from each other, according to the invention.

Fig. 5 shows the said separating device in a vertical section along the line 5—5 in Fig. 4.

Fig. 6 shows the said separating device in a vertical section along the line 6—6 in Fig. 4.

Figs. 7 and 8 is a plan and a side view of an embodiment somewhat different from those shown in Figs. 1 to 6.

Figure 1:
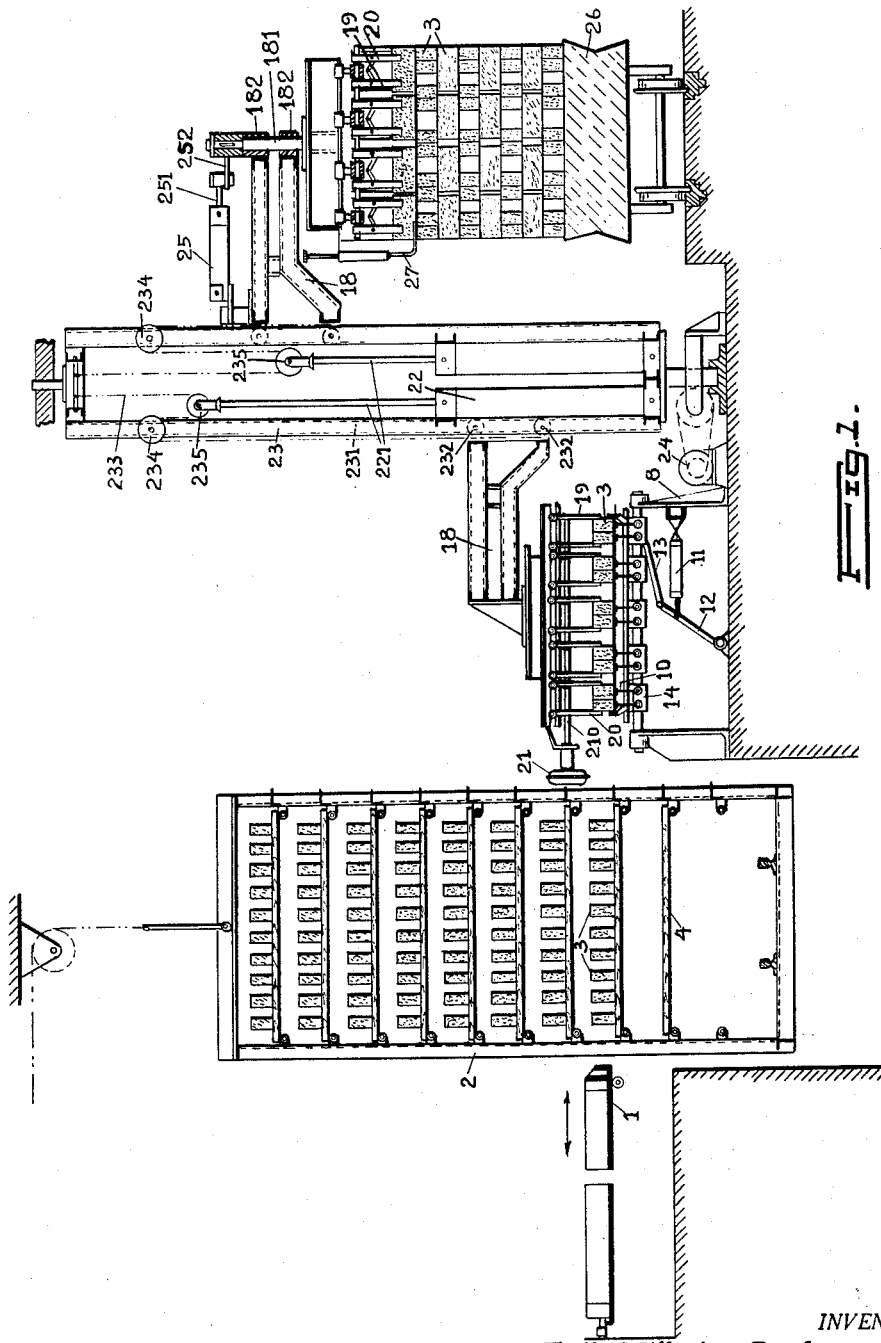
Fig. 1 shows the apparatus in a sectional side view.

In the drawing, the numeral 1 denotes a mechanically, hydraulically or pneumatically driven feeding device which is movable to and fro and which is designed to push together the bricks 3 arriving on carts from the drying house and piled on the platform in an elevator 2. The bricks 3 are resting in the elevator on laths 4 in spaced-apart relation. Upon moving the feeding device 1 from the position shown in Fig. 1, the bricks will be pushed together, at first to the position shown in Fig. 3, and upon a further movement, to the right in the drawing, the bricks will be pushed upon a platform 5 until the right edges of the bricks meet a stop device 7.

The feeding device 1 is thereupon automatically moved back to the initial position as illustrated on Fig. 1, whereupon the elevator 2 is lowered one stage so that the following rows of bricks reach the level of the device 1. Simultaneously with these movements another feeding device 6 will be operated to perform a movement transverse to the movement of the feeding device 1, (Figs. 2 and 3), by means of which feeding device 6, the bricks on the platform 5 will be moved to the dividing or separating device 8 in which the forward edges of the bricks will be stopped by stop plates 9.

Each brick will now rest on a plate 10. The said plates are connected two by two and in a suitable number arranged slidably in a direction transverse to the longitudinal axis of the plates upon bars 101. According to the embodiment shown in the drawing, twenty pairs of plates are disposed and arranged chess-board-like with five and four pairs of plates, respectively, in each row.

A hydraulically, or in any other manner, actuated piston 11 is adapted to operate a lever 12 which is pivotally connected to a link 13, the one end of which operates a system of links 141, by means of which system sliding shoes 14 connected by bars 172 to the pairs of plates 10, may be slid on sliding bars 142 disposed transversely to the longitudinal axes of the pairs of plates.

Upon moving the lever 12 by means of the piston 11 to the position shown in Fig. 5 by dash-dotted lines, the sliding shoes 14 will, by means of the link system 141, be pushed together, thereby causing also the pairs of plates to be brought together.

On bars 172, transversally disposed to the slide bars 142, sliding shoes 173 are slidable in the longitudinal direction, upon which the pairs of plates 10 are longitudinally slidable to and from each other. For this purpose the sliding shoes are connected to each other by means of links 171, which may be operated by means of a lever 16, the one end of which is pivotally journalled, and which lever 16 may be influenced by a hydraulically, or in any other manner, operated piston 15, the other end of the said lever 16 being connected to the link system 171.

When the lever 16 is in the position as indicated in Fig. 6 with dash-dotted lines, the sliding shoes 14 and together with them the pairs of plates 10 are brought together, so that, when the lever 12 is in the position indicated in Fig. 5 with dash-dotted lines, all pairs of plates form a practically closed platform, upon which the bricks may easily be pushed from the platform 5 by means of the feeding device 6.

Upon swinging the levers 12 and 16 by means of the pistons 11 and 15, respectively, to the positions shown in Figs. 5 and 6 with unbroken lines, the pairs of plates 10, upon which the bricks rest two by two, will be separated from each other, until the link systems 141, 171 are brought in an almost nearly horizontal position. The bricks are now arranged at mutual distances suitable for the burning process, as shown in Figs. 1 and 2.

It is obvious that the separating device 8 may be adapted for any desired distance between the bricks and for an arbitrary number of bricks.

The pairs of bricks are now in the position shown in Figs. 1 and 2 to be transferred to a transporting device, for instance to a tunnel cart, for transmission to a tunnel-kiln.

For this purpose gripper devices 18 are disposed which are elevatable in a guiding device 23, which is journalled on the top and bottom and is vertical and rotatable around its longitudinal axis. Besides being swingable, each gripper is also adapted to be lifted and lowered within guide rails 231, in which the guide rollers 232 of the gripper are guided. By means of a wire or a chain 233, the one end of which is fixed to the gripper, and the other end of which is fixed at the top of the guide device 23, the intermediate part of the wire 233 being led over leading rollers 234 and 235, the gripper 18 may be lifted or lowered. The leading roller 235 is journalled on the free end of a piston 221 which is longitudinally slidable in, for instance, a hydraulic pressure cylinder 22. When the piston 221 is influenced by a pressure medium in the cylinder 22, the gripper may be lifted or lowered.

On the underneath side of the gripper 18 are disposed gripping arms 19, 20, movable to and from each other, which arms are adapted to grip the bricks 3 and keep them firmly during the lifting of the gripper 18. For this purpose, the gripping arms are slidable in parallel on bars 210 and may be operated by means of a lever system (not shown in the drawing) from a pressure device 21, so that the gripping arms may exert a pressure effect alongside the bricks. To each longitudinal row of pairs of bricks belongs one row of gripping arms or fingers 19, 20, so that all in the separating device 8 piled pairs of bricks may simultaneously be lifted by means of the gripper 18. After the gripper having been lifted to a sufficiently high level, the guiding device 23 is by means of a motor 24 rotated around its vertical axis, whereupon the gripper is lowered down to the loading surface of, for instance, a cart 26 upon which the bricks shall be placed.

The gripping arms 19, 20 of the grippers 18 are thereupon released from the bricks by lowering the pressure in the pressure device 21. The gripper may then be lifted and swung back to its initial position. The gripper may now be lowered to the next "batch" of bricks ready in the separating device 8.

Practically that portion of one of the grippers 18 which is provided with the gripper arms 19, 20, is rotatable in the horizontal plane, for instance, by means of a vertical shaft 181 which is journalled in bearings 182 on the beam of the gripper. The said shaft is actuated by a pressure cylinder 25, the piston of which is articulatedly connected to a lever 252, by means of which the shaft 181 may be turned for instance 90°, so that the brick rows on the cart platform may be displaced 90°.

A feeler 27, adjustable in height in dependency of the height of the brick pile, is adapted by means of a gearing device (not shown in the drawing) to operate the pressure cylinder 22 which cause the lifting and lowering of the gripping device, so that, immediately as the bricks have come in touch with the underlying layer of bricks, the lowering movement of the gripper is instantly interrupted at the same time as the pressure device 21 is operated for releasing the gripping arms 19, 20, whereupon the gripping device may again be lifted and swung back to the position above the separating device.

Since a comparatively low capacity is needed, only one single gripping device may be disposed, which in this case is swung around the shaft 181 every second time when the gripping device is rotated with the guiding device 23.

Between and along the platform 5, and for the rest in all places, where particles of clay may be deposited, openings are provided through which the said particles may be detached.

By suitable adjustment of the lever system causing the swinging of the shaft 181 and consequently of the gripping arms 19, 20, it is possible to arrange the different layers of bricks in an angle of 45°.

Instead of the platform 5 there may, according to Figs. 7 and 8, be provided an endless conveyor belt 51 which is driven intermittently by a belt 52 so that, as soon as there is a number of bricks suitable for being transferred to the separating device 8 before the stop 7 and in a position to be fed forward by the second feeding device 6, the movement of the conveyor belt is instantly stopped and the bricks will by means of the feeding device 6 be transferred to the separating device 8.

In order to detach loose clay particles coming from the elevator 2, there is provided in front of the conveyor belt an opening 53 and another opening 71 in front of the stop device 7.

All devices forming part of the combination are compulsorily driven in dependence of each other and combined in such a manner that, in case of an interruption in one of the devices, all other devices will instantly be stopped.

While the invention has been described and illustrated with respect to certain preferred examples which give satisfactory results, it will be understood by those skilled in the art after understanding the principle of the invention, that various changes and modifications may be made without departing from the spirit and scope of the invention and it is intended therefore in the appended claims to cover all such changes and modifications.

What is claimed is:

1. An apparatus for handling bricks comprising an elevator having a vertical row of spaced tiers of bricks, a feeding device on one side of said elevator, the bottom tier of bricks being lowerable to the level of said feeding device, a flat horizontal support on the opposite side of said elevator, said feeding device adapted to move horizontally through said elevator and feed said bottom tier of bricks in closed formation longitudinally onto said flat support, a second feeding device on one side of said flat support, a separator device on the opposite side of said flat support, said second feeding device movable horizontally transversely across said flat support to transfer the bricks in closed formation onto said separator device, means on said separator device for disposing the bricks thereon in pairs of aligned and longitudinally abutting bricks, said pairs of bricks being spaced and arranged in longitudinal and transverse rows, a conveyor device spaced longitudinally from said separator device, at least one gripping device interposed between said separator device and conveyor device for gripping said pairs of bricks, said gripping devices raising and lowering said gripped pairs of bricks and swingable 180 degrees about a vertical axis to transfer said pairs of bricks from said separator device to said conveyor device.

2. An apparatus according to claim 1, wherein said separator device comprises pairs of longitudinally juxtaposed aligned rectangular plates on which said pairs of bricks are supported, said plates and bricks arranged in rectangular relatively closed formation, link means along the sides of said rectangular formation, the link means on opposite sides being interconnected, said link means being operable to expand said closed formation into a more open formation of longitudinal and transverse rows of spaced pairs of plates and bricks.

3. An apparatus according to claim 1, wherein said gripping device comprises a vertical frame rotatable 180 degrees about a central vertical axis, an assembly of gripping fingers supported on said frame for vertical movement, said gripping finger assembly being rotatable 90 degrees about a central axis offset from said vertical axis of said frame whereby every other tier of bricks is disposed at right angles to the adjacent tier of bricks therebelow.

4. An apparatus according to claim 1, said flat horizontal support comprising a stationary platform.

5. An apparatus according to claim 1, said flat horizontal support comprising an endless conveyor belt.

References Cited in the file of this patent

UNITED STATES PATENTS

| | | |
|---|---|---|
| 2,651,896 | Woodruff et al. | Sept. 15, 1933 |
| 2,692,058 | Straub | Oct. 19, 1954 |
| 2,710,696 | Fontaine et al. | June 14, 1955 |
| 2,738,116 | Barraclough | Mar. 13, 1956 |